(12) United States Patent
Kushida et al.

(10) Patent No.: US 11,552,331 B2
(45) Date of Patent: Jan. 10, 2023

(54) SOLID ELECTROLYTE COMPOSITION, SOLID ELECTROLYTE-CONTAINING SHEET, ALL-SOLID STATE SECONDARY BATTERY, METHOD OF MANUFACTURING SOLID ELECTROLYTE-CONTAINING SHEET, AND METHOD OF MANUFACTURING ALL-SOLID STATE SECONDARY

(71) Applicant: FUJIFILM Corporation, Tokyo (JP)

(72) Inventors: Yo Kushida, Kanagawa (JP); Masaomi Makino, Kanagawa (JP); Tomonori Mimura, Kanagawa (JP); Hiroaki Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 16/843,907

(22) Filed: Apr. 9, 2020

(65) Prior Publication Data
US 2020/0235426 A1     Jul. 23, 2020

Related U.S. Application Data

(63) Continuation of application No. PCT/JP2018/037617, filed on Oct. 9, 2018.

(30) Foreign Application Priority Data

Nov. 17, 2017 (JP) .............................. JP2017-221843

(51) Int. Cl.
| | | |
|---|---|---|
| H01M 10/0562 | (2010.01) | |
| H01M 10/0525 | (2010.01) | |
| H01M 4/139 | (2010.01) | |
| H01M 4/62 | (2006.01) | |
| H01M 4/13 | (2010.01) | |

(52) U.S. Cl.
CPC ......... *H01M 10/0562* (2013.01); *H01M 4/13* (2013.01); *H01M 4/139* (2013.01); *H01M 4/62* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 9,276,263 B2 | 3/2016 | Koshida et al. | |
| 2015/0147660 A1* | 5/2015 | Fujiki | H01M 4/62 29/623.5 |
| 2016/0204465 A1* | 7/2016 | Mimura | H01M 10/0565 429/162 |
| 2016/0204468 A1* | 7/2016 | Makino | C08G 18/6692 429/310 |
| 2018/0062162 A1 | 3/2018 | Maeda | |
| 2018/0254519 A1 | 9/2018 | Maeda et al. | |
| 2019/0088949 A1 | 3/2019 | Makino et al. | |
| 2019/0214673 A1 | 7/2019 | Maeda | |

FOREIGN PATENT DOCUMENTS

| | | |
|---|---|---|
| CN | 105144435 | 12/2015 |
| EP | 2988351 | 2/2016 |
| JP | 2013008611 | 1/2013 |
| KR | 20150060517 | 6/2015 |
| WO | 2012173089 | 12/2012 |
| WO | 2016136983 | 9/2016 |
| WO | 2016152262 | 9/2016 |
| WO | 2017047378 | 3/2017 |
| WO | 2017204027 | 11/2017 |
| WO | 2017213156 | 12/2017 |

OTHER PUBLICATIONS

"Office Action of China Counterpart Application" with English translation thereof, dated Jul. 1, 2021, p. 1-p. 24.
Office Action of China Counterpart Application, with English translation thereof, dated Feb. 2, 2021, pp. 1-19.
"Search Report of Europe Counterpart Application", dated Dec. 2, 2020, p. 1-p. 8.
"International Search Report (Form PCT/ISA/210) of PCT/JP2018/037617," dated Dec. 18, 2018, with English translation thereof, pp. 1-4.
"Written Opinion of the International Searching Authority (Form PCT/ISA/237) of PCT/JP2018/037617," dated Dec. 18, 2018, with English translation thereof, pp. 1-10.
"Office Action of Korea Counterpart Application" with English translation thereof, dated Oct. 19, 2021, p. 1-p. 13.
"Office Action of Japan Counterpart Application" with English translation thereof, dated Dec. 7, 2021, p. 1-p. 7.
"Office Action of Japan Counterpart Application" with English translation thereof, dated Mar. 16, 2021, p. 1-p. 5.

* cited by examiner

*Primary Examiner* — Gregg Cantelmo
(74) *Attorney, Agent, or Firm* — JCIPRNET

(57) ABSTRACT

A solid electrolyte composition includes: an inorganic solid electrolyte (A) having ion conductivity of a metal belonging to Group 1 or Group 2 in the periodic table; a binder (B); and a dispersion medium (C), in which the binder (B) includes a first binder (B1) that precipitates by a centrifugal separation process and a second binder (B2) that does not precipitate by the centrifugal separation process, the centrifugal separation process being performed in the dispersion medium (C) at a temperature of 25° C. at a centrifugal force of 610000 G for 1 hour, and a content X of the first binder (B1) and a content Y of the second binder (B2) satisfy the following expression, $0.01 \leq Y/(X+Y) < 0.10$.

16 Claims, 1 Drawing Sheet

SOLID ELECTROLYTE COMPOSITION, SOLID ELECTROLYTE-CONTAINING SHEET, ALL-SOLID STATE SECONDARY BATTERY, METHOD OF MANUFACTURING SOLID ELECTROLYTE-CONTAINING SHEET, AND METHOD OF MANUFACTURING ALL-SOLID STATE SECONDARY

CROSS-REFERENCE TO RELATED APPLICATIONS

This application is a Continuation of PCT International Application No. PCT/JP2018/37617, filed on Oct. 9, 2018, which claims priority under 35 U.S.C. § 119(a) to Japanese Patent Application No. 2017-221843, filed on Nov. 17, 2017. Each of the above application(s) is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, a method of manufacturing a solid electrolyte-containing sheet, and a method of manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety and reliability which are considered as problems of batteries in which the organic electrolytic solution is used can be significantly improved, and it also becomes possible to extend the service lives. Further, an all-solid state secondary battery may have a laminate structure in which electrodes and an electrolyte are directly disposed in series. Therefore, the energy density can be further increased as compared to a secondary battery in which an organic electrolytic solution is used, and the application to an electric vehicle or a large-sized storage battery is expected.

In order to put the all-solid state secondary battery into practice, an investigation on a material for forming a solid electrolyte layer, a positive electrode or negative electrode active material layer, or the like has actively progressed.

For example, WO2017/047378A describes that a composite particulate binder including a polymer having a particle structure and a water-soluble polymer is added to each of slurries for forming a solid electrolyte layer and electrode active material layers and an all-solid state secondary battery is manufactured using this slurry. With the technique described in WO2017/047378A, output characteristics and charge-discharge cycle of the all-solid state secondary battery can be improved.

SUMMARY OF THE INVENTION

In order to increase the energy density of the all-solid state secondary battery, it is necessary to laminate the solid electrolyte layer and the electrode active material layers. This lamination is typically performed under a pressurization condition. Therefore, in a case where adhesiveness between solid particles forming a layer is not sufficient, a defect such as cracking is likely to occur.

In order to improve binding properties between solid particles forming the solid electrolyte layer and the electrode active material layer, it is considered to add a binder formed of a resin to a material for forming each of the layers. However, in general, the binder does not have ion conductivity. Accordingly, in a case where the binder is added, the resistance increases, and it is difficult to obtain a secondary battery having a desired ion conductivity.

In addition, a material for forming a solid electrolyte layer and electrode active material layers includes solid particles of an inorganic solid electrolyte, an active material, and the like. Therefore, the thickness of the layer formed using this material is likely to vary. The variation in thickness causes a variation in battery performance. In addition, there is a limit on the area of the formed layer, which causes a problem in, for example, application to a large-sized battery.

Therefore, an object of the present invention is to provide a solid electrolyte composition including an inorganic solid electrolyte, a binder, and a dispersion medium. By forming a layer using this composition, a layer having a uniform thickness can be formed, and the layer exhibits excellent ion conductivity.

In addition, another object of the present invention is to provide a solid electrolyte-containing sheet, an electrode sheet for an all-solid state secondary battery, and an all-solid state secondary battery that have uniform thickness and exhibit excellent ion conductivity, and methods of manufacturing the same.

The present inventors repeatedly conducted a thorough investigation in consideration of the above-described objects. As a result, it was found that, in a solid electrolyte composition used for forming a solid electrolyte layer and an electrode active material layer forming an all-solid state secondary battery, by using not only a specific amount of a particle polymer but also a specific amount of a polymer that is present in a supernatant without precipitating even after an ultracentrifugal separation process in a dispersion medium of the composition (a polymer that is soluble in the dispersion medium of the composition or is present in the form of fine particles having a small particle size in the dispersion medium) in combination, the above-described objects can be achieved. The present invention has been completed based on the above findings as a result of repeated investigation.

That is, the above-described objects have been achieved by the following means.

[1] A solid electrolyte composition comprising:
an inorganic solid electrolyte (A) having ion conductivity of a metal belonging to Group 1 or Group 2 in the periodic table;
a binder (B); and
a dispersion medium (C), in which the binder (B) includes a first binder (B1) that precipitates by a centrifugal separation process and a second binder (B2) that does not precipitate by the centrifugal separation process, the centrifugal separation process being performed in the dispersion medium (C) at a temperature of 25° C. at a centrifugal force of 610000 G for 1 hour, and a content X of the first binder (B1) and a content Y of the second binder (B2) satisfy the following expression by mass, $$0.01 \leq Y/(X+Y) < 0.10.$$

[2] The solid electrolyte composition according to [1], wherein the dispersion medium (C) is an organic solvent.

[3] The solid electrolyte composition according to [1] or [2], in which the first binder (B1) is a particulate binder.

[4] The solid electrolyte composition according to any one of [1] to [3], in which a polymer forming the binder (B) includes a polymer that includes a component having a polyalkylene oxide chain.

[5] The solid electrolyte composition according to any one of [1] to [4], in which a polymer forming the binder (B) includes a polymer that includes a component having a nitrile group.

[6] The solid electrolyte composition according to any one of [1] to [5], in which the dispersion medium (C) includes a hydrocarbon solvent.

[7] The solid electrolyte composition according to any one of [1] to [6], further comprising an active material (D).

[8] The solid electrolyte composition according to any one of [1] to [7], further comprising a conductive auxiliary agent (E).

[9] The solid electrolyte composition according to any one of [1] to [8], in which the inorganic solid electrolyte (A) is a sulfide-based inorganic solid electrolyte.

[10] A solid electrolyte-containing sheet that is formed of the solid electrolyte composition according to any one of [1] to [9].

[11] A solid electrolyte-containing sheet comprising:

an inorganic solid electrolyte (A) having ion conductivity of a metal belonging to Group 1 or Group 2 in the periodic table;

a binder (B); and a solvent (C1), in which the binder (B) includes a first binder (B1) that precipitates by a centrifugal separation process and a second binder (B2) that does not precipitate by the centrifugal separation process, the centrifugal separation process being performed in the solvent (C1) at a temperature of 25° C. at a centrifugal force of 610000 G for 1 hour, and a content X of the first binder (B1) and a content Y of the second binder (B2) satisfy the following expression by mass, $$0.01 \leq Y/(X+Y) < 0.10.$$

[12] An electrode sheet for an all-solid state secondary battery comprising the solid electrolyte-containing sheet according to [10] or [11].

[13] An all-solid state secondary battery comprising:

a positive electrode active material layer;

a negative electrode active material layer; and a solid electrolyte layer that is interposed between the positive electrode active material layer and the negative electrode active material layer, in which at least one of the positive electrode active material layer, the negative electrode active material layer, or the solid electrolyte layer is the solid electrolyte-containing sheet according to [10] or [11].

[14] A method of manufacturing a solid electrolyte-containing sheet comprising applying the solid electrolyte composition according to any one of [1] to [9] to a substrate to form a coating film.

[15] The method of manufacturing a solid electrolyte-containing sheet according to [14] further comprising drying the coating film.

[16] A method of manufacturing an all-solid state secondary battery comprising the method of manufacturing a solid electrolyte-containing sheet according to [14] or [15].

The solid electrolyte composition according to the present invention includes an inorganic solid electrolyte, a binder having a specific composition, and a dispersion medium. By using this solid electrolyte composition as a material for forming a layer forming an all-solid state secondary battery, a layer having a uniform thickness can be formed, and this layer exhibits excellent ion conductivity.

In the solid electrolyte-containing sheet, the electrode sheet for an all-solid state secondary battery, and the all-solid state secondary battery according to the present invention, a uniform thickness can be realized, and excellent ion conductivity is exhibited.

With the method of manufacturing a solid electrolyte-containing sheet and the method of manufacturing an all-solid state secondary battery according to the present invention, the above-described solid electrolyte-containing sheet and the all-solid state secondary battery according to the present invention can be obtained.

DESCRIPTION OF THE PREFERRED EMBODIMENTS

Figure 1:
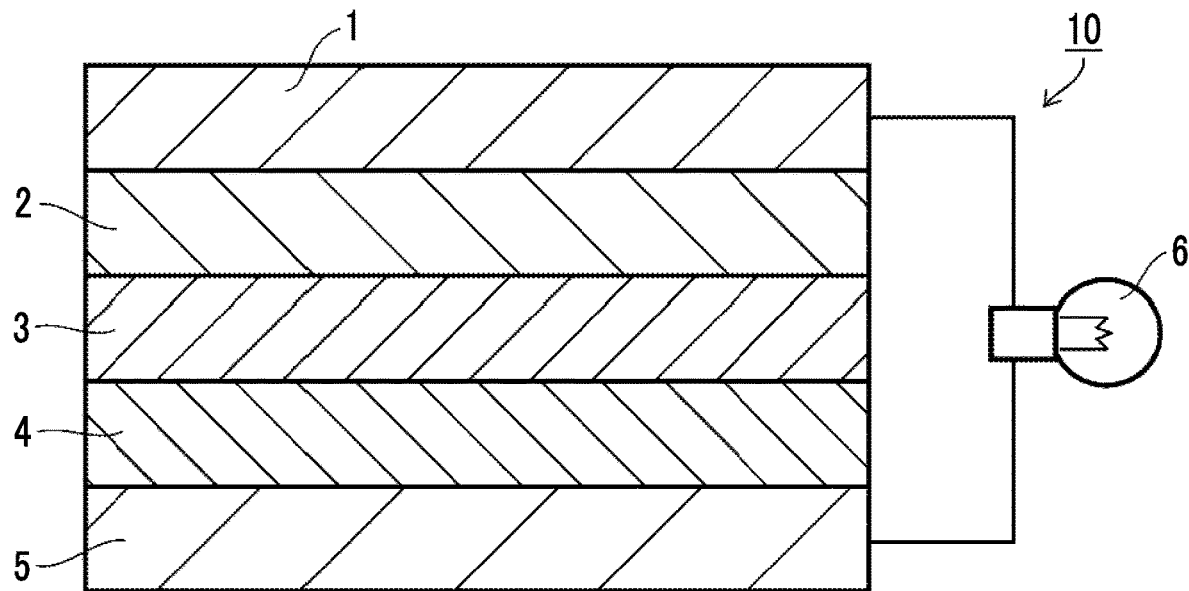
FIG. 1 is a vertical cross-sectional view schematically illustrating an all-solid state secondary battery according to a preferred embodiment of the present invention.

In the description of the present invention, numerical ranges represented by "to" include numerical values before and after "to" as lower limit values and upper limit values.

[Solid Electrolyte Composition]

A solid electrolyte composition according to an embodiment of the present invention comprises: an inorganic solid electrolyte having ion conductivity of a metal belonging to Group 1 or Group 2 in the periodic table; a binder (B); and a dispersion medium (C).

The binder (B) includes, at a specific ratio, a binder that precipitates by an ultracentrifugal separation process in a state where it is included in the dispersion medium (C) and a binder (that remains in a supernatant) that does not precipitate by the ultracentrifugal separation process. That is, the binder (B) includes a binder (first binder (B1)) that precipitates after a centrifugal separation process (ultracentrifugal separation process) and a binder (second binder (B2)) that remains in a supernatant without precipitating after the centrifugal separation process, the centrifugal separation process being performed at a temperature of 25° C. at a centrifugal force of 610000 G for 1 hour in a state where the binder (B) is dispersed or dissolved in the dispersion medium (C).

In the solid electrolyte composition according to the embodiment of the present invention, a relationship between a content X of the first binder (B1) and a content Y of the second binder (B2) satisfies the following expression by mass.

$$0.01 \leq Y/(X+Y) < 0.10.$$

The solid electrolyte composition according to the embodiment of the present invention may include an active material (D) described below as desired. In addition, the solid electrolyte composition may include a conductive auxiliary agent (E). The solid electrolyte composition including the above-described components can be used as a material for forming an electrode active material layer.

A mixed state of the respective components in the solid electrolyte composition according to the embodiment of the present invention is not particularly limited as long as the solid electrolyte composition includes the respective components defined by the present invention. It is preferable that the solid electrolyte composition according to the embodiment of the present invention is in a state where the respective components are substantially uniformly dispersed in the dispersion medium at least before or during use.

In the solid electrolyte composition according to the embodiment of the present invention, the binder (B) has the above-described configuration. By using this composition for forming a layer, a layer having a uniform thickness can be formed. In addition, this layer also has excellent ion conductivity.

The respective components that form or may form the solid electrolyte composition will be described.

<Inorganic Solid Electrolyte (A)>

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers (LiPF$_6$, LiBF$_4$, LiFSI, LiCl, and the like). The inorganic solid electrolyte is not particularly limited as long as it has ion conductivity of a metal belonging to Group 1 or Group 2 in the periodic table and generally does not have electron conductivity.

In the present invention, the inorganic solid electrolyte has ion conductivity of a metal belonging to Group 1 or Group 2 in the periodic table. The inorganic solid electrolyte can be appropriately selected from solid electrolyte materials to be applied to this kind of products and used. Representative examples of the inorganic solid electrolyte include (i) a sulfide-based inorganic solid electrolyte and (ii) an oxide-based inorganic solid electrolyte. From the viewpoint of a high ion conductivity and easiness in joining interfaces between particles, a sulfide-based inorganic solid electrolyte is preferable.

In a case where an all-solid state secondary battery according to the embodiment of the present invention is an all-solid state lithium ion secondary battery, the inorganic solid electrolyte preferably has ion conductivity of lithium ions.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive sulfide-based inorganic solid electrolyte satisfying a composition represented by the following Formula (I).

$$L_{a1}M_{b1}P_{c1}S_{d1}A_{e1} \qquad \text{Formula (I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide (Li$_2$S), phosphorus sulfide (for example, diphosphoruspentasulfide (P$_2$S$_5$)), a phosphorus single body, a sulfur single body, sodium sulfide, hydrogen sulfide, lithium halides (for example, LiI, LiBr, and LiCl), or sulfides of an element represented by M (for example, SiS$_2$, SnS, and GeS$_2$).

The ratio between Li$_2$S and P$_2$S$_5$ in Li—P—S-based glass and Li—P—S-based glass ceramic is preferably 60:40 to 90:10 and more preferably 68:32 to 78:22 in terms of the molar ratio between Li$_2$S:P$_2$S$_5$. By mixing Li$_2$S and P$_2$S$_5$ at a ratio in the above-described range, a sulfide-based inorganic solid electrolyte having a high lithium ion conductivity can be obtained. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include Li$_2$S—P$_2$S$_5$, Li$_2$S—P$_2$S$_5$—LiCl, Li$_2$S—P$_2$S$_5$—H$_2$S, Li$_2$S—P$_2$S$_5$—H$_2$S—LiCl, Li$_2$S—LiI—P$_2$S$_5$, Li$_2$S—LiI—Li$_2$O—P$_2$S$_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—

$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. With the amorphization method, treatments at a normal temperature can be performed, and manufacturing steps can be simplified.

(ii) Oxide-Based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

Specific examples of the compound include: $Li_{xa}La_{ya}TiO_3$ ($0.3 \leq xa \leq 0.7$ and $0.3 \leq ya \leq 0.7$) (LLT); $Li_{xb}La_{yb}Zr_{zb}M^{bb}{}_{mb}O_{nb}$ ($M^{bb}$ represents at least one element selected from Al, Mg, Ca, Sr, V, Nb, Ta, Ti, Ge, In, or Sn, $5 \leq xb \leq 10$, $1 \leq yb \leq 4$, $1 \leq zb \leq 4$, $0 \leq mb \leq 2$, and $5 \leq nb \leq 20$); $Li_{xc}B_{yc}M^{cc}{}_{zc}O_{nc}$ ($M^{cc}$ represents at least one element selected from C, S, Al, Si, Ga, Ge, In, or Sn, $0 \leq xc \leq 5$, $0 \leq yc \leq 1$, $0 \leq zc \leq 1$, and $0 \leq nc \leq 6$); $Li_{xd}(Al,Ga)_{yd}(Ti,Ge)_{zd}Si_{ad}P_{md}O_{nd}$ ($1 \leq xd \leq 3$, $0 \leq yd \leq 1$, $0 \leq zd \leq 2$, $0 \leq ad \leq 1$, $1 \leq md \leq 7$, and $3 \leq nd \leq 13$); $Li_{(3-2xe)}M^{ee}{}_{xe}D^{ee}O$ ($0 \leq xe \leq 0.1$, $M^{ee}$ represents a divalent metal atom, and $D^{ee}$ represents a halogen atom or a combination of two or more halogen atoms); $Li_{xf}Si_{yf}O_{zf}$ ($1 \leq xf \leq 5$, $0 < yf \leq 3$, and $1 \leq zf \leq 10$); $Li_{xg}S_{yg}O_{zg}$ ($1 \leq xg \leq 3$, $0 < yg \leq 2$, and $1 \leq zg \leq 10$); $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ ($w < 1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ ($0 \leq xh \leq 1$, and $0 \leq yh \leq 1$); and $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$) and LiPON in which some of oxygen atoms in lithium phosphate are substituted with nitrogen atoms, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al, C, Ga, or the like) and the like.

The inorganic solid electrolyte is preferably in the form of particles. In this case, the particle size of the inorganic solid electrolyte is not particularly limited. From the viewpoints of ion conductivity, workability, and interface formability, the particle size of the inorganic solid electrolyte is preferably 0.01 μm or more, more preferably 0.2 μm or more, and still more preferably 0.3 μm or more. In addition, the particle size of the inorganic solid electrolyte is preferably 100 μm or less, more preferably 50 μm or less, still more preferably 20 μm or less, still more preferably 4 μm or less, and still more preferably 2 μm or less.

The particle size of the inorganic solid electrolyte particles refer to the average particle size and can be determined as described below.

The inorganic solid electrolyte particles are diluted and adjusted to 1 mass % of a dispersion liquid by using water (heptane in a case where the inorganic solid electrolyte is unstable in water) in a 20 mL sample bottle. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five samples are prepared and the average value thereof is adopted.

As the inorganic solid electrolyte, one kind may be used alone, or two or more kinds may be used in combination.

The content of the inorganic solid electrolyte in the solid electrolyte composition is not particularly limited. From the viewpoints of reducing the interface resistance during use in an all-solid state secondary battery and maintaining the reduced interface resistance, the content of the inorganic solid electrolyte is preferably 5 parts by mass or more, more preferably 10 parts by mass or more, and still more preferably 20 parts by mass or more with respect to 100 parts by mass of the solid components in the composition. In addition, from the same viewpoints, the content of the inorganic solid electrolyte is preferably 99.9 parts by mass or less, more preferably 99.5 parts by mass or less, and still more preferably 99 parts by mass or less with respect to 100 parts by mass of the solid components in the composition.

In the present invention, the solid content (solid component) refers to components that neither volatilize nor evaporate and disappear in a case where the solid electrolyte composition is dried at 120° C. for 6 hours in a nitrogen atmosphere at a pressure of 1 mmHg. Typically, the solid content refers to components other than a dispersion medium described below.

<Binder (B)>

The solid electrolyte composition according to the embodiment of the present invention includes the binder (B). The binder (B) in the composition can be formed of various polymers. The binder (B) may include a particle polymer or a non-particle polymer. As described below, the solid electrolyte composition according to the embodiment of the present invention includes, at a specific ratio, a binder that becomes a precipitate component after an ultracentrifugal separation process under a specific condition and a binder that becomes a supernatant component after the ultracentrifugal separation process.

First, the polymer that may form the binder (B) will be described. The binder (B) can be formed of, for example, an organic resin described below.

<Fluorine-Containing Resin>

Examples of a fluorine-containing resin include polytetrafluoroethylene (PTFE), polyvinylidene difluoride (PVdF), and a copolymer (PVdF-HFP) of polyvinylidene difluoride and hexafluoropropylene.

(Hydrocarbon-Based Thermoplastic Resin)

Examples of a hydrocarbon-based thermoplastic resin include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

((Meth)Acrylic Resin)

Examples of a (meth)acrylic resin include various (meth)acrylic monomers, (meth)acrylamide monomers, and copolymers of two or more monomers thereof.

In addition, copolymers of vinyl monomers are also be suitably used. Examples of the copolymers include a copolymer of methyl (meth)acrylate and styrene, a copolymer of methyl (meth)acrylate and acrylonitrile, and a copolymer of butyl (meth)acrylate, acrylonitrile, and styrene. However, the copolymers are not limited to these examples. In the present specification, the copolymer may be any one of a statistic copolymer or a periodic copolymer and is preferably a random copolymer.

(Other Resins)

Examples of other resins include a polyurethane resin, a polyurea resin, a polyamide resin, a polyimide resin, a polyester resin, a polyether resin, a polycarbonate resin, and a cellulose derivative resin.

Among these, a fluorine-containing resin, a hydrocarbon-based thermoplastic resin, a (meth)acrylic resin, a polyurethane resin, a polycarbonate resin, or a cellulose derivative resin is preferable, and a (meth)acrylic resin or a polyurethane resin is more preferable from the viewpoint of high affinity to the inorganic solid electrolyte, high flexibility of the resin itself, and strong binding properties with the solid particles.

The above-described various resins are commercially available. In addition, the binder resin particles or the polymer forming the binder resin particles can also be prepared using an ordinary method.

The above-described organic resin is merely exemplary, and the binder (B) according to the embodiment of the present invention is not limited to this configuration.

In the present invention, unless specified otherwise, the weight-average molecular weight of the polymer refers to the weight-average molecular weight in terms of standard polystyrene measured by gel permeation chromatography (GPC). The measured value is a value measured under the following condition. In this case, an appropriate eluent can be appropriately selected and used depending on the kind of the polymer.

(Conditions)

Column: A column obtained by connecting TOSOH TSK-gel Super HZM-H (trade name), TOSOH TSKgel Super HZ4000 (trade name), and TOSOH TSKgel Super HZ2000 (trade name)

Carrier: tetrahydrofuran

Measurement temperature: 40° C.

Carrier flow rate: 1.0 mL/min

Sample concentration: 0.1 mass %

Detector: refractive index (RI) detector

That is, the binder (B) included in the solid electrolyte composition according to the embodiment of the present invention includes a binder (first binder (B1)) that precipitates after a centrifugal separation process and a binder (second binder (B2)) that remains in a supernatant without precipitating after the centrifugal separation process at a specific ratio described below, the centrifugal separation process (hereinafter, simply referred to as "ultracentrifugal separation process") being performed at a temperature of 25° C. at a centrifugal force of 610000 G for 1 hour in a state where the binder (B) is dispersed or dissolved in the dispersion medium described below forming the solid electrolyte composition (a part thereof may be dissolved). After the ultracentrifugal separation process, the content of the binder in the dispersion medium is 0.1 to 10 mass %. Within the above-described range of the content, even in a case where the content of the binder varies, a phenomenon in which the precipitate component is present in a supernatant or the supernatant component is converted into the precipitate component does not occur in practice. In addition, the determination of the physical properties of the binder based on the ultracentrifugal separation process is performed in a state where only the binder is dispersed or dissolved in the dispersion medium.

In the solid electrolyte composition according to the embodiment of the present invention, a relationship between the content X of the first binder (B1) and the content Y of the second binder (B2) satisfies the following expression by mass.

$$0.01 \leq Y/(X+Y) < 0.10.$$

That is, a proportion of the polymer that is present in a supernatant without precipitating after the ultracentrifugal separation process in the polymer forming the binder (B) included in the solid electrolyte composition is 1 mass % or higher and lower than 10 mass %. In other words, a proportion of the polymer that is dissolved in the dispersion medium and/or is present in the dispersion medium as resin fine particles having a small particle size after the ultracentrifugal separation process in the polymer forming the binder (B) is 1 mass % or higher and lower than 10 mass %.

On the other hand, the first binder (B1) is typically present in the dispersion medium as resin fine particles.

In the solid electrolyte composition according to the embodiment of the present invention, the first binder (B1) and the second binder (B2) may be present independently or may be present in a state where they interact with each other (adsorption or the like).

It is preferable that the relationship between the content X of the first binder (B1) and the content Y of the second binder (B2) satisfies the following expression by mass.

$$0.015 \leq Y/(X+Y) \leq 0.09$$

It is more preferable that the relationship satisfies the following expression.

$$0.02 \leq Y/(X+Y) \leq 0.08$$

It is still more preferable that the relationship satisfies the following expression.

$$0.025 \leq Y/(X+Y) \leq 0.075$$

In a layer that is formed of the solid electrolyte composition in which the binder is dissolved in the dispersion medium, substantially all the solid particle surfaces are covered with the binder. In this state, binding properties between the solid particles can be improved. However, typically, the interface resistance increases, and the ion conductivity decreases. Therefore, in the layer that is formed by allowing the binder to be present in the form of particles using the resin that is not dissolved in the dispersion medium, for example, as described in JP2015-088486A, the technique of suppressing an increase in interface resistance while improving binding properties between the solid particles is reported.

On the other hand, the solid electrolyte composition according to the embodiment of the present invention includes not only a specific amount of the first binder (B1) that is insoluble in the dispersion medium and becomes the precipitate component after the ultracentrifugal separation process but also a specific amount of the second binder (B2) that is dissolved in the dispersion medium or is present in the form of particles having a small particle size and becomes the supernatant component after the ultracentrifugal separation process. That is, this idea is simply different from a technique in which a fine particle polymer is used as a binder. As a result, in a layer formed using this composition, an increase in interface resistance is effectively suppressed, and the ion conductivity is excellent. In addition, by adopting this binder composition, the thickness of the entire layer that is formed using this solid electrolyte composition becomes more uniform. The reason for this is presumed to be as follows. The first binder (B1) partially covers the solid particle surfaces without coating the solid particle surfaces such that binding properties between the solid particles can be improved without a decrease in ion conductivity. In addition, the second binder (B2) also functions as a dispersant of the solid particles such that aggregation of the solid particles in the slurry is suppressed. This way, a combination of the effects of the binders acts.

(First Binder (B1))

The first binder (B1) exhibits the above-described behavior after the ultracentrifugal separation process. In the solid electrolyte composition according to the embodiment of the present invention, the first binder (B1) is typically in the form of particles. The particle size of the first binder (B1) is preferably 10 to 10000 nm, more preferably 50 to 1000 nm, and still more preferably 100 to 500 nm. The particle size of the binder particles refers to an average primary particle size. The measurement of the average particle size of the binder particles can be determined using the same method as the method of measuring the particle size of the inorganic solid electrolyte. In a case where the particle size of the binder particles is less than or equal to a measurement limit of the above-described device, the particle size is measured using a transmission electron microscope (TEM) after optionally drying and hardening the binder resin particles.

From the viewpoint of improving binding properties between the solid particles, the number-average molecular weight of the polymer forming the first binder (B1) is preferably 10000 to 1000000 and more preferably 30000 to 500000. An aspect in which the first binder (B1) is formed of a crosslinked product of a polymer having a weight-average molecular weight in the above-described range is also preferable.

(Second Binder (B2))

The second binder (B2) exhibits the above-described behavior after the ultracentrifugal separation process. The second binder (B2) is a polymer that is soluble in the dispersion medium forming the composition or is present in the form of particles having a small particle size in the dispersion medium forming the composition. In addition, the second binder (B2) is present in a state where it interacts (for example, adsorption) with the first binder (B1).

From the viewpoint of improving an adsorption rate to the solid particles, the number-average molecular weight of the polymer forming the second binder (B2) is preferably 1000 to 100000 and more preferably 3000 to 50000.

From the viewpoint of improving the adsorption amount to the solid particles due to an increase in polarity, it is preferable that a polymer forming the binder (B) includes a polymer that includes a component having a polyalkylene oxide chain.

In addition, from the viewpoint of suppressing swelling of latex particles in a coating solvent caused by improvement of a cohesive force, it is preferable that a polymer forming the binder (B) includes a polymer that includes a component having a nitrile group (cyano group).

From the viewpoints of reducing the interface resistance during use in the all-solid state secondary battery and maintaining the reduced interface resistance, the total content of the first binder (B1) and the second binder (B2) in the solid electrolyte composition according to the embodiment of the present invention is preferably 0.01 parts by mass or more, more preferably 0.1 parts by mass or more, and still more preferably 1 parts by mass or more with respect to 100 parts by mass of the solid components. In addition, from the viewpoint of battery performance, the total content is preferably 20 parts by mass or less, more preferably 10 parts by mass or less, and still more preferably 5 parts by mass or less.

In addition, in the solid electrolyte composition according to the embodiment of the present invention, a mass ratio [(Mass of Inorganic Solid Electrolyte+Mass of Active Material)/Mass of Binder Resin Particles] of the content of the solid particles (the total content of the inorganic solid electrolyte and the active material) to the content of the binder (B) is preferably 1000 to 1, more preferably 500 to 2, and still more preferably 100 to 10.

The binder (B) included in the solid electrolyte composition according to the embodiment of the present invention may be formed of one polymer having the same component ratio as that of the kind of the component. In this case, for example, by using a polymer having a wide molecular weight distribution, the polymer is separated into the precipitate component and the supernatant component after the ultracentrifugal separation process. Typically, the binder (B) includes two or more polymers including different components (having different component ratios). It is preferable that the binder (B) includes 2 to 10 polymers including different components, it is more preferable that the binder (B) includes 2 to 5 polymers including different components, and it is still more preferable that the binder (B) includes 2 to 4 polymers including different components.

<Active Material (D)>

The solid electrolyte composition according to the embodiment of the present invention may include the active material capable of intercalating and deintercalating ions of a metal element belonging to Group 1 or Group 2 in the periodic table. Examples of the active material include a positive electrode active material and a negative electrode active material. The solid electrolyte composition including the active material can be suitably used for forming an electrode active material layer of an all-solid state secondary battery.

The shape of the active material is not particularly limited, but is preferably a particle shape. In addition, the particle size of the active material is not particularly limited as long as it satisfies the above-described particle size. From the viewpoint of improving dispersibility, improving the contact area between the solid particles, and reducing the interfacial reactivity, the particle size of the active material is preferably 0.1 μm or more, more preferably 1 μm or more, and still more preferably 2 μm or more. In addition, the particle size of the active material is preferably 20 μm or less, more preferably 10 μm or less, and still more preferably 5 μm or less. The particle size of the active material refers to an average particle size and can be determined using the same method as that of the particle size of the inorganic solid electrolyte. In a case where the particle size of the active material is less than or equal to a measurement limit of the particle size analyzer, the particle size is measured using a transmission electron microscope (TEM) after optionally drying and hardening the active material.

Examples of the active material include a positive electrode active material and a negative electrode active material. In particular, a metal oxide (preferably a transition metal oxide) that is the positive electrode active material, a metal oxide that is the negative electrode active material, or metal such as Sn, Si, Al, or In capable of forming an alloy with lithium is preferable.

In the present invention, the solid electrolyte composition including the active material (the positive electrode active material or the negative electrode active material) will be referred to as an electrode composition (a positive electrode composition or a negative electrode composition).

(Positive Electrode Active Material)

The positive electrode active material is preferably capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the $M^b$ mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

In order to allow the positive electrode active material to have a desired particle size, an ordinary pulverizer or classifier may be used. Positive electrode active materials obtained using a calcination method may be used after being washed with water, an acidic aqueous solution, an alkaline aqueous solution, or an organic solvent.

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited. The mass can be appropriately determined depending on the designed battery capacity.

The content of the positive electrode active material in the solid electrolyte composition is not particularly limited, but is preferably 10 to 95 parts by mass, more preferably 30 to 90 parts by mass, still more preferably 50 to 85 parts by mass, and still more preferably 55 to 80 parts by mass with respect to 100 parts by mass of the solid content.

(Negative Electrode Active Material)

The negative electrode active material is preferably capable of reversibly intercalating and deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, a carbonaceous material or a lithium composite oxide is preferably used from the viewpoint of reliability. In addition, the metal composite oxide is preferably capable of intercalating and deintercalating lithium. The material is not particularly limited, but preferably includes titanium and/or lithium as a constituent element from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ when measured by an X-ray diffraction method using CuKα rays, and the oxide may have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferable since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

In order to allow the negative electrode active material to have a predetermined particle size, an ordinary pulverizer or classifier may be used. For example, a mortar, a ball mill, a sand mill, a vibration ball mill, a satellite ball mill, a planetary ball mill, a swirling air flow jet mill, a sieve, or the like is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method.

The chemical formulae of the compounds obtained using a calcination method can be measured by inductively coupled plasma (ICP) optical emission spectroscopy, and can be calculated from the mass difference of powder before and after calcinating as a convenient method.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited. The mass can be appropriately determined depending on the designed battery capacity.

The content of the negative electrode active material in the solid electrolyte composition is not particularly limited, but is preferably 10 to 80 parts by mass and more preferably 20 to 80 parts by mass with respect to 100 parts by mass the solid content.

—Surface Coating of Active Material—

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

<Conductive Auxiliary Agent (E)>

The solid electrolyte composition according to the embodiment of the present invention may include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used.

In the present invention, in a case where the negative electrode active material and the conductive auxiliary agent are used in combination, among the above-described conductive auxiliary agents, a conductive auxiliary agent that does not intercalate and deintercalate Li and does not function as a negative electrode active material during charging and discharging of the battery is classified as the conductive auxiliary agent. Therefore, among the conductive auxiliary agents, a conductive auxiliary agent that can function as the negative electrode active material in the negative electrode active material layer during charging and discharging of the battery is classified as a negative electrode active material not as a conductive auxiliary agent. Whether or not the conductive auxiliary agent functions as the negative electrode active material during charging and discharging of the battery is not uniquely determined but is determined based on a combination of the conductive auxiliary agent with the negative electrode active material.

As the conductive auxiliary agent, one kind may be used alone, or two or more kinds may be used in combination.

In particular, a carbon black such as acetylene black, Ketjen black, or furnace black or a carbon fiber such as vapor-grown carbon fiber or carbon nanotube is preferable.

The particle size of the conductive auxiliary agent is not particularly limited and, from the viewpoints of forming a conductive path and obtaining the dispersibility of the solid electrolyte composition, is preferably 0.001 μm or more, more preferably 0.01 μm or more, still more preferably 0.05 μm or more, and still more preferably 0.1 μm or more. In addition, the upper limit is preferably 20 μm or less, more preferably 5 μm or less, still more preferably 3 μm or less, still more preferably 2 μm or less, and most preferably 0.5 μm or less.

The particle size of the conductive auxiliary agent refers to an average particle size and is measured using the same method as that of the particle size of the inorganic solid electrolyte. In a case where the particle size is less than or equal to a measurement limit of the device, the particle size is determined using a TEM after optionally drying and hardening the conductive auxiliary agent.

The content of the conductive auxiliary agent in the solid electrolyte composition is preferably 0.1 to 5 parts by mass and more preferably 0.5 to 3 parts by mass with respect to 100 parts by mass of the solid content.

<Dispersion Medium (C)>

The solid electrolyte composition according to the embodiment of the present invention includes the dispersion medium as a medium for dispersing the inorganic solid electrolyte, the active material, the conductive auxiliary agent, the binder particles, and the like.

The dispersion medium is not particularly limited as long as it can disperse the respective components included in the solid electrolyte composition according to the embodiment of the present invention, and examples thereof include various organic solvents. Specific examples of the dispersion medium include an alcohol compound, an ether compound, an amide compound, an amine compound, a ketone compound, an aromatic compound, an aliphatic compound, a nitrile compound, and an ester compound.

Examples of the alcohol compound include methyl alcohol, ethyl alcohol, 1-propyl alcohol, 2-propyl alcohol, 2-butanol, ethylene glycol, propylene glycol, 1,6-hexanediol, cyclohexanediol, 1,3-butanediol, and 1,4-butanediol.

Examples of the ether compound include alkylene glycols (triethylene glycol and the like), alkylene glycol monoalkyl ethers (ethylene glycol monomethyl ether and the like), alkylene glycol dialkyl ethers (ethylene glycol dimethyl ether and the like), dialkyl ethers (diisopropyl ether, dibutyl ether, and the like), and cyclic ethers (tetrahydrofuran, and dioxane (including each of 1,2-, 1,3-, and 1,4-isomers), and the like).

Examples of the amide compound include N,N-dimethylformamide, N-methyl-2-pyrrolidone, 2-pyrrolidinone, 1,3-dimethyl-2-imidazolidinone, 2-pyrrolidinone, ε-caprolactam, formamide, N-methylformamide, acetamide, N-m ethylacetamide, N,N-dimethylacetamide, N-methylpropanamide, and hexamethylphosphorictriamide.

Examples of the amine compound include triethylamine, diisopropylethylamine, and tributylamine.

Examples of the ketone compound include acetone, methyl ethyl ketone, methyl isobutyl ketone, cyclopentanone, cyclohexanone, cycloheptanone, dipropyl ketone, dibutyl ketone, diisopropyl ketone, diisobutyl ketone, isobutyl propyl ketone, sec-butyl propyl ketone, pentyl propyl ketone, and butyl propyl ketone.

Examples of the aromatic compound include benzene, toluene, and xylene.

Examples of the aliphatic compound include hexane, heptane, octane, decane, cyclohexane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

Examples of a non-aqueous dispersion medium include the aromatic compound solvent and the aliphatic compound solvent described above.

It is preferable that the dispersion medium used for the solid electrolyte composition according to the embodiment of the present invention includes a hydrocarbon compound. The hydrocarbon compound is a compound formed of hydrocarbon among the aromatic compound and the aliphatic compound described above. A proportion of the hydrocarbon compound in the dispersion medium is preferably 50 mass % or higher, more preferably 60 mass % or higher, still more preferably 70 mass % or higher, still more preferably 80 mass % or higher, and still more preferably 90 mass % or higher. It is also preferable that the dispersion medium is formed of the hydrocarbon compound.

The number of dispersion media in the solid electrolyte composition may be one or two or more. In a case where the dispersion medium is formed of two or more compounds (solvents), it is preferable that the compounds are compatible with each other without being phase-separated.

The number of carbon atoms in the compound forming the dispersion medium is not particularly limited and is preferably 2 to 30, more preferably 4 to 20, still more preferably 6 to 15, and still more preferably 7 to 12.

The C Log P value of the compound forming the dispersion medium is preferably 1 or higher, more preferably 2 or higher, and still more preferably 3 or higher. The upper limit is not particularly limited and is practically 10 or lower.

In the present invention, the C log P value refers to a value obtained by calculating a common logarithm Log P of a partition coefficient P between 1-octanol and water. As a method or software used for calculating the C Log P value, a well-known one can be used. Unless specified otherwise, the C Log P value is a value calculated after drawing a structure using ChemDraw (manufactured by PerkinElmer Co., Ltd.).

For example, the C Log P values of the dispersion media described above are as follows: toluene (C Log P=2.5), hexane (C Log P=3.9), heptane (C Log P=4.4), octane (C Log P=4.9), cyclohexane (C Log P=3.4), cyclooctane (C Log P=4.5), decalin (C Log P=4.8), dibutyl ketone (C Log P=3.0), dibutyl ether (C Log P=3.0), butyl butyrate (C Log P=2.8), and tributylamine (C Log P=4.8).

The content of the dispersion medium in the solid electrolyte composition is not particularly limited, but is preferably 20% to 80 mass %, more preferably 30% to 70 mass %, and particularly preferably 40% to 60 mass %.

<Dispersant>

It is also preferable that the solid electrolyte composition according to the embodiment of the present invention includes a dispersant. In a case where the content of any one of the conductive auxiliary agent, the electrode active material, or the inorganic solid electrolyte is high and/or in a case where the particle size of the electrode active material and the inorganic solid electrolyte is small such that the surface area increases, by adding the dispersant, the aggregation thereof can be further suppressed, and the active material layer can be more uniformly formed. As the dispersant, a dispersant that is generally used for an all-solid state secondary battery can be appropriately selected and used. Generally, a compound intended for particle adsorption and steric repulsion and/or electrostatic repulsion is preferably used.

<Other Additives>

As components other than the respective components described above, the solid electrolyte composition according to the embodiment of the present invention may optionally include a lithium salt, an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant.

[Method of manufacturing Solid Electrolyte Composition]

The solid electrolyte composition according to the embodiment of the present invention can be prepared by mixing the first binder (B1), the second binder (B2), and the inorganic solid electrolyte and optionally the active material, the conductive auxiliary agent, the additives, and the like in the presence of the dispersion medium (C) (by dispersing the components the dispersion medium). In the solid electrolyte composition according to the embodiment of the present invention, the second binder (B2) may be dissolved in the dispersion medium. The solid electrolyte composition according to the embodiment of the present invention is preferably prepared as a slurry.

The slurry of the solid electrolyte composition can be prepared by mixing the respective components described above using a variety of mixers (dispersers). The mixer is not particularly limited, and examples thereof include a ball mill, a beads mill, a planetary mixer, a blade mixer, a roll mill, a kneader, a thin-film spin system high-speed mixer, a high-speed rotary stirrer, and a disc mill. The mixing (dispersing) conditions are not particularly limited. However, in a case where a ball mill is used, the inorganic solid electrolyte and the dispersion medium are preferably mixed together at 150 to 700 rpm (rotation per minute) for 1 to 24 hours. Two dispersers may be used in two or more steps.

In the present invention, the mixing order of the respective components is not particularly limited, and the components may be mixed at once or sequentially.

The conductive auxiliary agent and the binder may be mixed in the form of particles without any change but are preferably mixed in the form of a dispersion liquid in which the conductive auxiliary agent is dispersed in the dispersion medium in advance (a part of the binder may be dissolved in the dispersion medium). As a result, secondary aggregation of the conductive auxiliary agent can be prevented, and the particle size can be controlled.

The solid electrolyte composition according to the embodiment of the present invention is preferably used as a material for forming a solid electrolyte-containing sheet and a material for forming a solid electrolyte layer or an electrode active material layer of an all-solid state secondary battery, the solid electrolyte-containing sheet being preferably used for an all-solid state secondary battery.

[Solid Electrolyte-Containing Sheet]

A solid electrolyte-containing sheet according to the embodiment of the present invention is a sheet-shaped molded body and includes the inorganic solid electrolyte (A), the binder (B), and a solvent (C1) and optionally the active material (D), the conductive auxiliary agent (E), and various additives. The inorganic solid electrolyte (A), the binder (B), the active material (D), the conductive auxiliary agent (E), the additives, and the like have the same definitions as described above regarding the solid electrolyte composition according to the embodiment of the present invention.

In addition, the solvent (C1) has the same definition as that of the dispersion medium (C) in the solid electrolyte composition according to the embodiment of the present invention. That is, the binder (B) in the solid electrolyte-containing sheet according to the embodiment of the present invention includes a binder (first binder (B1)) that precipitates after a centrifugal separation process and a binder (second binder (B2)) that remains in a supernatant without precipitating after the centrifugal separation process at a specific ratio described below, the centrifugal separation process (hereinafter, simply referred to as "ultracentrifugal separation process") being performed at a temperature of 25° C. at a centrifugal force of 610000 G for 1 hour in a state where the binder (B) is dispersed in the solvent (C1) forming the solid electrolyte-containing sheet (a part thereof may be dissolved). After the ultracentrifugal separation process, the content of the binder in the solvent (C1) is 0.1 to 10 mass %.

In the solid electrolyte-containing sheet according to the embodiment of the present invention, a relationship between the content X of the first binder (B1) and the content Y of the second binder (B2) satisfies the following expression by mass.

$$0.01 \leq Y/(X+Y) < 0.10$$

It is preferable that the relationship satisfies the following expression.

$$0.015 \leq Y/(X+Y) \leq 0.09$$

It is more preferable that the relationship satisfies the following expression.

$$0.02 \leq Y/(X+Y) \leq 0.08$$

It is still more preferable that the relationship satisfies the following expression.

$$0.025 \leq Y/(X+Y) \leq 0.075$$

It is preferable that the solid electrolyte-containing sheet according to the embodiment of the present invention is formed using the solid electrolyte composition according to the embodiment of the present invention. In this case, the solvent (C1) forming the solid electrolyte-containing sheet is a residual solvent of the dispersion medium (C) forming the solid electrolyte composition that remains without being volatilized during the formation of the solid electrolyte-containing sheet.

In the solid electrolyte-containing sheet according to the embodiment of the present invention, a preferable range of a content ratio between the respective components forming the solid content is the same as a preferable content ratio between the respective components forming the solid content in the solid electrolyte composition according to the embodiment of the present invention. In addition, in the solid electrolyte-containing sheet according to the embodiment of the present invention, the content of the solvent (C1) is preferably 0.01% to 10 mass % and more preferably 0.1% to 5 mass %.

In the solid electrolyte-containing sheet according to the embodiment of the present invention, the uniformity of the thickness can be improved to a desired level, and the interface resistance between the solid particles can be sufficiently suppressed. Therefore, in an all-solid state secondary battery that is obtained by using the solid electrolyte-containing sheet according to the embodiment of the present invention as a solid electrolyte layer or an electrode active material layer in the all-solid state secondary battery, a variation in performance is small, and the ion conductivity is also excellent.

The solid electrolyte-containing sheet according to the embodiment of the present invention is preferably obtained by pressure forming.

The solid electrolyte-containing sheet according to the embodiment of the present invention can be suitably used as a solid electrolyte layer or an electrode active material layer of an all-solid state secondary battery.

The solid electrolyte-containing sheet according to the embodiment of the present invention may include other members such as a substrate or a release sheet. In addition, in a case where the solid electrolyte-containing sheet according to the embodiment of the present invention includes the active material, the solid electrolyte-containing sheet can be formed on a metal foil. In this case, in the all-solid state secondary battery that is formed using the solid electrolyte-containing sheet, the metal foil can function as a current collector. That is, an electrode sheet for an all-solid state secondary battery can be formed using the metal foil and the solid electrolyte-containing sheet formed on the metal foil.

Further, in the above-described electrode sheet for an all-solid state secondary battery, the solid electrolyte-containing sheet according to the embodiment of the present invention not including the active material may be provided on the solid electrolyte-containing sheet including the active material. This way, a laminate having a three-layer structure in which the metal foil, the solid electrolyte-containing sheet including the active material, and the solid electrolyte-containing sheet not including the active material are laminated may also be used as the electrode sheet for an all-solid state secondary battery.

Further, the above-described electrode sheet for an all-solid state secondary battery may also have a configuration in which the solid electrolyte-containing sheet including the active material is formed on the solid electrolyte-containing sheet not including the active material in the laminate having the above-described three-layer structure. In this case, among two solid electrolyte-containing sheets between which the solid electrolyte-containing sheet not including the active material is sandwiched, one solid electrolyte-containing sheet includes a positive electrode active material and another solid electrolyte-containing sheet includes a negative electrode active material.

In the electrode sheet for an all-solid state secondary battery having the three- or four-layer structure, at least one of the solid electrolyte-containing sheet including the active material or the solid electrolyte-containing sheet not including the active material may be different from the solid electrolyte-containing sheet according to the embodiment of the present invention.

In addition, the electrode sheet for an all-solid state secondary battery may include other layers such as a substrate (other than a current collector), a protective layer (release sheet), a current collector, or a coating layer.

The thickness of each of the layers forming the electrode sheet is the same as the thickness of each of the layers described below regarding the all-solid state secondary battery according to the embodiment of the present invention.

[Method of Manufacturing Solid Electrolyte-Containing Sheet]

A method of manufacturing a solid electrolyte-containing sheet according to the embodiment of the present invention is not particularly limited. Examples of the method of manufacturing a solid electrolyte-containing sheet include a method including forming a film (applying and drying) of the solid electrolyte composition according to the embodiment of the present invention to the substrate or the current collector (other layers may be interposed therebetween) to form the active material layer (applied and dried layer) on the substrate or the current collector. As a result, the solid electrolyte-containing sheet including the substrate or the current collector and the applied and dried layer can be prepared. Here, the applied and dried layer refers to a layer formed by applying the solid electrolyte composition according to the embodiment of the present invention and drying the dispersion medium (that is, a layer formed using the solid electrolyte composition according to the embodiment of the present invention and made of a composition obtained by volatilizing the dispersion medium from the solid electrolyte composition according to the embodiment of the present invention). In this case, instead of removing the entire amount of the dispersion medium, the applied and dried layer may include a residual solvent.

Each of steps of application, drying, or the like in the method of manufacturing a solid electrolyte-containing sheet according to the embodiment of the present invention will be described below regarding a method of manufacturing an all-solid state secondary battery.

In the method of manufacturing a solid electrolyte-containing sheet according to the embodiment of the present invention, it is also possible to pressurize the applied and dried layer obtained as described above. Pressurization conditions or the like will be described below regarding the method of manufacturing an all-solid state secondary battery.

In addition, the method of manufacturing a solid electrolyte-containing sheet according to the embodiment of the present invention may include a step of peeling the substrate, the protective layer (particularly, the release sheet), or the like.

[All-Solid State Secondary Battery]

The all-solid state secondary battery according to the embodiment of the present invention includes a positive electrode active material layer and a negative electrode active material layer that is disposed to face the positive electrode active material layer with the solid electrolyte layer sandwiched therebetween. At least one of the positive electrode active material layer, the solid electrolyte layer, or the negative electrode active material layer is formed of the solid electrolyte-containing sheet according to the embodiment of the present invention. That is, the all-solid state secondary battery according to the embodiment of the present invention has any one of a configuration in which one of the positive electrode active material layer, the solid electrolyte layer, or the negative electrode active material layer is formed of the solid electrolyte-containing sheet according to the embodiment of the present invention, a configuration in which two of the positive electrode active material layer, the solid electrolyte layer, and the negative electrode active material layer are formed of the solid electrolyte-containing sheet according to the embodiment of the present invention, or a configuration in which three of the positive electrode active material layer, the solid electrolyte layer, and the negative electrode active material layer are formed of the solid electrolyte-containing sheet according to the embodiment of the present invention.

The thickness of each of the negative electrode active material layer, the solid electrolyte layer, and the positive electrode active material layer is not particularly limited. In consideration of the dimension of a general all-solid state secondary battery, each of the thicknesses of the respective layers is preferably 10 to 1,000 µm and more preferably 20 µm or more and less than 500 µm. In the all-solid state secondary battery according to the embodiment of the present invention, the thickness of at least one layer of the positive electrode active material layer or the negative electrode active material layer is still more preferably 50 µm or more and less than 500 µm.

In the all-solid state secondary battery according to the embodiment of the present invention, typically, a current collector is provided on a surface opposite to a surface of each of the positive electrode active material layer and the negative electrode active material layer that is in contact with the solid electrolyte layer.

(Case)

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include a material for forming an aluminum alloy case, a stainless steel case, or the like. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short circuit prevention.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. In a case in which the above-described structure is employed, during charging, electrons (e$^-$) are supplied to the negative electrode side, and lithium ions (Li$^+$) are accumulated in the negative electrode side. On the other hand, during discharging, the lithium ions (Li$^+$) accumulated in the negative electrode side return to the positive electrode, and electrons are supplied to an operation portion 6. In an example illustrated in the drawing, an electric bulb is employed as the operation portion 6 and is lit by discharging.

The solid electrolyte composition according to the embodiment of the present invention can be preferably used as a material for forming the active material layer, in particular, as a material for forming the negative electrode active material layer. In addition, the solid electrolyte-containing sheet according to the embodiment of the present invention is suitable as the negative electrode active material layer and the positive electrode active material layer.

In the present specification, the positive electrode active material layer and the negative electrode active material layer will be collectively referred to as the active material layer.

In a case where the all-solid state secondary battery having a layer configuration illustrated in FIG. 1 is put into, for example, a 2032-type coin case, the all-solid state secondary battery will be referred to as "electrode sheet for an all-solid state secondary battery", and a battery prepared by putting this electrode sheet for an all-solid state secondary battery into a 2032-type coin case will be referred to as "all-solid state secondary battery", thereby referring to both batteries distinctively in some cases.

(Positive Electrode Active Material Layer, Solid Electrolyte Layer, and Negative Electrode Active Material Layer)

In the all-solid state secondary battery 10, at least one of the positive electrode active material layer 4, the solid electrolyte layer 3, or the negative electrode active material layer 2 is formed using the solid electrolyte composition according to the embodiment of the present invention or the solid electrolyte-containing sheet according to the embodiment of the present invention.

The respective components included in the positive electrode active material layer 4, the solid electrolyte layer 3, and the negative electrode active material layer 2 may be the same as or different from each other.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 µm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 µm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Method of Manufacturing All-Solid State Secondary Battery]

The all-solid state secondary battery can be manufactured using a typical method, except that at least one of the positive electrode active material layer, the solid electrolyte layer, or the negative electrode active material layer is formed using the solid electrolyte composition according to the embodiment of the present invention or the solid electrolyte-containing sheet according to the embodiment of the present invention. An example of manufacturing the all-solid state secondary battery according to the embodiment of the present invention will be described below.

The all-solid state secondary battery according to the embodiment of the present invention can be manufactured using a method including: a step of applying the solid electrolyte composition according to the embodiment of the present invention to a substrate (for example, a metal foil as a current collector) to form a coating film thereon; and a step of drying the coating film. That is, the all-solid state secondary battery according to the embodiment of the present invention can be manufactured through the above-described method of manufacturing a solid electrolyte-containing sheet according to the embodiment of the present invention.

For example, the solid electrolyte composition including the positive electrode active material is applied as a positive electrode composition to a metal foil which is a positive electrode current collector and is dried so as to form a positive electrode active material layer. As a result, a positive electrode sheet for an all-solid state secondary battery is prepared. Next, the solid electrolyte layer-forming composition for forming a solid electrolyte layer is applied to the positive electrode active material layer and is dried so as to form the solid electrolyte layer. Furthermore, the solid electrolyte composition including the negative electrode active material is applied as the negative electrode composition to the solid electrolyte layer and is dried so as to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. The above-described drying is not necessarily performed for each layer, and the composition may be dried after being applied in multiple layers. Optionally by sealing the laminate in a case, a desired all-solid state secondary battery can be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, the solid electrolyte composition including the negative electrode active material is applied as a negative electrode composition to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the electrode sheets, the solid electrolyte layer-forming composition is applied to a substrate to prepare a solid electrolyte-containing sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

An all-solid state secondary battery can also be manufactured by combining the above-described forming methods. For example, the positive electrode sheet for an all-solid state secondary battery, the negative electrode sheet for an all-solid state secondary battery, and the solid electrolyte-containing sheet for an all-solid state secondary battery are prepared respectively. Next, the solid electrolyte layer removed from the substrate is laminated on the negative electrode sheet for an all-solid state secondary battery, and the positive electrode sheet for an all-solid state secondary battery is bonded thereto. As a result, an all-solid state secondary battery can be manufactured. In this method, it is also possible to laminate the solid electrolyte layer on the positive electrode sheet for an all-solid state secondary battery and to bond the solid electrolyte layer to the negative electrode sheet for an all-solid state secondary battery.

<Formation of Respective Layers (Film Formation)>

A method of applying the solid electrolyte composition to form the layer of the all-solid state secondary battery is not particularly limited and can be appropriately selected. Examples of the method include coating (preferably wet-type coating), spray coating, spin coating, dip coating, slit coating, stripe coating, and bar coating.

In this case, the solid electrolyte composition or the like may be dried after being applied each time or may be dried after being applied in multiple layers. The drying temperature is not particularly limited and is preferably 30° C. or higher, more preferably 60° C. or higher, and still more preferably 80° C. or higher. In addition, the drying temperature is preferably 300° C. or lower, more preferably 250° C. or lower, and still more preferably 200° C. or lower. In a case where the solid electrolyte composition is heated in the above-described temperature range, the dispersion medium can be sufficiently volatilized to make the composition enter a solid state (applied and dried layer). In addition, the temperature is not excessively increased, and the respective members of the all-solid state secondary battery are not impaired, which is preferable.

It is preferable that each of the layers formed during the preparation of the all-solid state secondary battery is pressurized after the formation. In addition, the respective layers are also preferably pressurized in a state where they are laminated. Examples of the pressurization method include a method using a hydraulic cylinder pressing machine. A pressure is not particularly limited and may be a pressure at which the particle shape of the above-described components, for example, the inorganic solid electrolyte is lost. As described above, the above-described contact state and binding state of the solid particles can be realized by forming a film using the solid electrolyte composition according to the embodiment of the present invention and do not significantly deteriorate even after a pressure is applied thereto. For example, the pressure is preferably in a range of 50 to 1500 MPa.

In addition, the applied solid electrolyte composition may be heated while being pressurized. The heating temperature is not particularly limited, but is generally in a range of 30°

C. to 300° C. The respective layers or the all-solid state secondary battery can also be pressed at a temperature higher than the glass transition temperature of the inorganic solid electrolyte.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In addition, a restraining device (screw fastening pressure or the like) of the all-solid state secondary battery can also be used in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-Solid State Secondary Battery]

The all-solid state secondary battery according to the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric cars and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with solar batteries.

EXAMPLES

The present invention will be described in more detail based on Examples but is not limited to these examples.

[Synthesis of Sulfide-Based Inorganic Solid Electrolyte Li—P—S-Based Glass]

As a sulfide-based inorganic solid electrolyte, Li—P—S-based glass was synthesized with reference to a non-patent document of T. Ohtomo, A. Hayashi, M. Tatsumisago, Y. Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by Fritsch Japan Co., Ltd.), the full amount of the mixture of the lithium sulfide and the diphosphoruspentasulfide was put thereinto, and the container was completely sealed in an argon atmosphere. The container was set in a planetary ball mill P-7 (trade name; manufactured by Fritsch Japan Co., Ltd.), mechanical milling was carried out at a temperature of 25° C. and a rotation speed of 510 rpm for 20 hours. As a result, 6.20 g of a yellow powder of a sulfide-based inorganic solid electrolyte (Li—P—S-based glass; hereinafter, referred to as Li—P—S) was obtained.

[Preparation of Binder Solution]

<Preparation of Binder E-1 Solution>53.7 g of toluene was put into a 300 mL three-neck flask and was heated to 80° C. under stirring (solution A). Separately, 15.2 g of M-90G (trade name, manufactured by Shin-Nakamura Chemical Co., Ltd., methoxy polyethylene glycol methacrylate, molecular weight: 400), 2.0 g of acrylonitrile, 29.7 g of 2-ethylhexyl methacrylate, 0.47 g of 3-mercaptoisobutyric acid, and 0.47 g of V-601 (trade name, manufactured by Wako Pure Chemical Industries, Ltd.) were added to a 100 mL measuring cylinder and were stirred to be uniformly dissolved (solution B). The solution B was added dropwise to the solution A at 80° C. for 2 hours. Next, the solution was further stirred at 80° C. for 2 hours, was stirred at 95° C. for 2 hours, and was cooled to room temperature. An operation of putting this polymer solution into methanol, precipitating the polymer, and removing the solvent was repeated twice. Next, 52 g of heptane was added to the precipitate to prepare a heptane solution. This heptane solution was set as a binder E-1 solution. In the binder E-1 solution, the solid content concentration was 48 wt %, the weight-average molecular weight (Mw) was 11000, and the number-average molecular weight (Mn) was 6000.

<Preparation of Binder E-2 Solution>

A binder E-2 solution was obtained using the same preparation method as that of the binder E-1 solution, except that 4.3 g of butyl methacrylate and 23.8 g of 2-ethylhexyl methacrylate were used instead of 29.7 g of 2-ethylhexyl methacrylate. The solid content concentration was 47 wt %, Mw was 9000, and Mn was 4000.

<Preparation of Binder Solution E-3>

A binder E-3 solution was obtained using the same preparation method as that of the binder E-1 solution, except that butyl methacrylate was used instead of M-90G (trade name, manufactured by Shin-Nakamura Chemical Co., Ltd., methoxy polyethylene glycol methacrylate, molecular weight: 400). The solid content concentration was 48 wt %, Mw was 13000, and Mn was 7000.

<Preparation of Binder Solution E-4>

A binder E-4 solution was obtained using the same preparation method as that of the binder E-1 solution, except that ethyl acrylate was used instead of acrylonitrile. The solid content concentration was 46 wt %, Mw was 14000, and Mn was 9000.

[Preparation of Binder Mixed Solution]

<Preparation of Binder B-1 Mixed Solution>

12.5 g of the binder E-1 solution and 17.5 g of heptane were put into a 200 mL three-neck flask and were heated to 80° C. under stirring (solution A). Separately, 10.0 g of 2-methoxyethyl acrylate, 1.67 g of ARONIX M-5300 (trade name, manufactured by Toagosei Co., Ltd.), and 0.53 g of V-601 (trade name, manufactured by Wako Pure Chemical Industries, Ltd.) were added to a 50 mL measuring cylinder and were stirred to be uniformly dissolved (solution B). The solution B was added dropwise to the solution A at 80° C. for 2 hours. Next, the solution was further stirred at 80° C. for 2 hours, was stirred at 90° C. for 2 hours, was polymerized, and was cooled to room temperature. This way, a part of the binder was dispersed in the heptane to obtain a dispersion liquid. This dispersion liquid was set as a binder B-1 mixed solution. The volume average particle size of a particulate binder forming a dispersoid of the binder B-1 mixed solution was 220 nm.

In the binder B-1 mixed solution, polymers having various characteristics or properties are present in a state where various states are mixed. For example, in the binder B-1 mixed solution, the binder E-1 was present in a state where it was dissolved in the dispersion medium (heptane), or was present by adsorption or the like in or on a three-dimensional structure of the polymerization reactant during the preparation of the binder B-1 mixed solution. In addition, in the binder B-1 mixed solution, a large amount of the polymerization reactant during the preparation of the binder B-1 mixed solution was present in the form of particles (dispersed state). However, a polymerization reactant having a low molecular weight was present in a state where it was dissolved in the dispersion medium, or as fine particles having a small particle size.

That is, the polymer present in the binder B-1 mixed solution was dissolved, was present in the form of particles having various sizes, and was adsorbed to the inside or the surfaces of the particles although it was soluble. In addition, the polymer present in the binder B-1 mixed solution also has a wide molecular weight distribution.

The same is applicable to binder B-2 to B-5 mixed solutions described below.

<Preparation of Binder B-2 Mixed Solution>

A binder B-2 mixed solution was obtained using the same preparation method as that of the binder B-1 mixed solution, except that the binder E-2 solution was used instead of the binder E-1 solution. The volume average particle size of a particulate binder forming a dispersoid of the binder B-2 mixed solution was 190 nm.

<Preparation of Binder B-3 Mixed Solution>

A binder B-3 mixed solution was obtained using the same preparation method as that of the binder B-1 mixed solution, except that 2-ethylhexyl acrylate was used instead of M-5300. The binder B-3 mixed solution was a high-viscosity solution exhibiting turbid yellow.

<Preparation of Binder B-4 Mixed Solution>

A binder B-4 mixed solution was obtained using the same preparation method as that of the binder B-1 mixed solution, except that the binder E-3 solution was used instead of the binder E-1 solution. The volume average particle size of a particulate binder forming a dispersoid of the binder B-4 mixed solution was 200 nm.

<Preparation of Binder B-5 Dispersion Liquid>

A binder B-5 mixed solution was obtained using the same preparation method as that of the binder B-1 mixed solution, except that the binder E-4 solution was used instead of the binder E-1 solution. The volume average particle size of a particulate binder forming a dispersoid of the binder B-5 mixed solution was 190 nm.

[Ultracentrifugal Separation Process of Binder Mixed Solution]

Each of the binder B-1 to B-5 mixed solutions prepared as described above was diluted with heptane to obtain diluted mixed solution including 0.8 mass % of the polymer in total. 16 g of the diluted mixed solution (including 0.128 g of the polymer) was put into a polypropylene tube (manufactured by Hitachi Koki Co., Ltd.) and was sealed with a tube sealer (manufactured by Hitachi Koki Co., Ltd.). Next, this tube was set in a loader of a micro-ultracentrifuge (trade name: himac CS-150 FNX, manufactured by Hitachi Koki Co., Ltd.) and was processed with an ultracentrifugal separation process under conditions of 100000 rpm and 25° C. for 1 hour. The centrifugal force of the ultracentrifugal separation process was 610000 G (the centrifugal force was applied to the bottom of the tube). Due to this process, a precipitated binder and a binder that remained in a supernatant without precipitating were separated.

[Preparation of Binder (B)-Containing Solution]

<Preparation of Binder S-1-Containing Solution>

A precipitated binder a1 (first binder (B1)) and a binder a2 (second binder (B2)) that remained in a supernatant were mixed with heptane to obtain a binder S-1-containing solution, the binders being obtained by processing the binder B-1 mixed solution in [Ultracentrifugal Separation Process of Binder Mixed Solution]. Specifically, the three components were put into a vial tube such that the amount of the binder a1 was 0.12646 g, the amount of the binder a2 was 0.001536 g, and the amount of heptane was 1.152 g, and were stirred using a mix rotor for 30 minutes. As a result, the binder S-1-containing solution was prepared. In the binder S-1-containing solution, the first binder (B1) was in the form of particles having a particle size of about 100 to 130 nm.

<Preparation of Binder S-2-Containing Solution>

A binder S-2-containing solution was prepared using the same preparation method as that of the binder S-1-containing solution, except that the amount of the binder a1 put into the vial tube was changed to 0.12416 g and the amount of the binder a2 put into the vial tube was 0.00384 g.

<Preparation of Binder S-3-Containing Solution>

A binder S-3-containing solution was prepared using the same preparation method as that of the binder S-1-containing solution, except that the amount of the binder a1 put into the vial tube was changed to 0.11904 g and the amount of the binder a2 put into the vial tube was 0.00896 g.

<Preparation of Binder S-4-Containing Solution>

A binder S-4-containing solution was prepared using the same preparation method as that of the binder S-1-containing solution, except that the amount of the binder a1 put into the vial tube was changed to 0.11648 g and the amount of the binder a2 put into the vial tube was 0.01152 g.

<Preparation of Binder S-5-Containing Solution>

A precipitated binder b1 (first binder (B1)) and a binder b2 (second binder (B2)) that remained in a supernatant were mixed with heptane to obtain a binder S-5-containing solution, the binders being obtained by processing the binder B-2 mixed solution in [Ultracentrifugal Separation Process of Binder Mixed Solution]. Specifically, the three components were put into a vial tube such that the amount of the binder b1 was 0.11904 g, the amount of the binder b2 was 0.00896 g, and the amount of heptane was 1.152 g, and were stirred using a mix rotor for 30 minutes. As a result, the binder S-5-containing solution was prepared. In the binder S-5- containing solution, the first binder (B1) was in the form of particles having a particle size of about 150 to 190 nm.

<Preparation of Binder S-6-Containing Solution>

A precipitated binder c1 (first binder (B1)) and a binder c2 (second binder (B2)) that remained in a supernatant were mixed with heptane to obtain a binder S-6-containing solution, the binders being obtained by processing the binder B-3 mixed solution in [Ultracentrifugal Separation Process of Binder Mixed Solution]. Specifically, the three components were put into a vial tube such that the amount of the binder c1 was 0.11904 g, the amount of the binder c2 was 0.00896 g, and the amount of heptane was 1.152 g, and were stirred using a mix rotor for 30 minutes. As a result, the binder S-6-containing solution was prepared. In the binder S-6-containing solution, the first binder (B1) was in the form of particles having a particle size of about 160 to 210 nm.

<Preparation of Binder S-7-Containing Solution>

A precipitated binder d1 (first binder (B1)) and a binder d2 (second binder (B2)) that remained in a supernatant were mixed with heptane to obtain a binder S-7-containing solution, the binders being obtained by processing the binder B-4 mixed solution in [Ultracentrifugal Separation Process of Binder Mixed Solution]. Specifically, the three components were put into a vial tube such that the amount of the binder d1 was 0.11904 g, the amount of the binder d2 was 0.00896 g, and the amount of heptane was 1.152 g, and were stirred using a mix rotor for 30 minutes. As a result, the binder S-7-containing solution was prepared. In the binder S-7-containing solution, the first binder (B1) was in the form of particles having a particle size of about 120 to 150 nm.

<Preparation of Binder S-8-Containing Solution>

A precipitated binder e1 (first binder (B1)) and a binder e2 (second binder (B2)) that remained in a supernatant were mixed with heptane to obtain a binder S-8-containing solution, the binders being obtained by processing the binder B-5 mixed solution in [Ultracentrifugal Separation Process of Binder Mixed Solution]. Specifically, the three components were put into a vial tube such that the amount of the binder e1 was 0.11904 g, the amount of the binder e2 was 0.00896 g, and the amount of heptane was 1.152 g, and were stirred using a mix rotor for 30 minutes. As a result, the binder S-8-containing solution was prepared. In the binder S-8-containing solution, the first binder (B1) was in the form of particles having a particle size of about 140 to 200 nm.

<Preparation of Binder T-1-Containing Solution>

A binder T-1-containing solution was prepared using the same preparation method as that of the binder S-1-containing solution, except that the amount of the binder a1 put into the vial tube was changed to 0.12710 g and the amount of the binder a2 put into the vial tube was 0.000896 g.

<Preparation of Binder T-2-Containing Solution>

A binder T-2-containing solution was prepared using the same preparation method as that of the binder S-1-containing solution, except that the amount of the binder a1 put into the vial tube was changed to 0.11264 g and the amount of the binder a2 put into the vial tube was 0.01536 g.

<Preparation of Binder T-3-Containing Solution>

The binder B-1 mixed solution prepared as described above was diluted with heptane to obtain diluted mixed solution including 0.8 mass % of the polymer in total. 16 g of the diluted mixed solution (including 0.128 g of the polymer) was put into a polypropylene tube (manufactured by Hitachi Koki Co., Ltd.) and was sealed with a tube sealer (manufactured by Hitachi Koki Co., Ltd.). Next, this tube was set in a loader of a micro-ultracentrifuge (trade name: himac CS-150 FNX, manufactured by Hitachi Koki Co., Ltd.) and was processed with an ultracentrifugal separation process under conditions of 50000 rpm and 25° C. for 1 hour. The centrifugal force of the ultracentrifugal separation process was 305000 G (the centrifugal force was applied to the bottom of the tube). Due to this process, a precipitated binder a1-2 and a binder a2-2 that remained in a supernatant without precipitating were separated.

A binder T-3-containing solution was prepared using the same preparation method as that of the binder S-1-containing solution, except that the binder a1-2 was used instead of the binder a1, the amount of the binder a1-2 put into the vial tube was 0.11904 g, the binder a2-2 was used instead of the binder a2, and the amount of the binder a2-2 put into the vial tube was 0.00896 g.

The binder compositions of the binder (B)-containing solutions prepared as described above are collectively shown in the following table.

TABLE 1

| Binder (B)-Containing Solution | First Binder (B1) | | Second Binder (B2) | | |
|---|---|---|---|---|---|
| Kind | Kind | Amount | Kind | Amount | Y/(X + Y) |
| S-1 | a1 | 0.12646 g | a2 | 0.001536 g | 0.012 |
| S-2 | a1 | 0.12416 g | a2 | 0.00384 g | 0.030 |
| S-3 | a1 | 0.11904 g | a2 | 0.00896 g | 0.070 |
| S-4 | a1 | 0.11648 g | a2 | 0.01152 g | 0.090 |
| S-5 | b1 | 0.11904 g | b2 | 0.00896 g | 0.070 |
| S-6 | c1 | 0.11904 g | c2 | 0.00896 g | 0.070 |
| S-7 | d1 | 0.11904 g | d2 | 0.00896 g | 0.070 |
| S-8 | e1 | 0.11904 g | e2 | 0.00896 g | 0.070 |
| T-1 | a1 | 0.12710 g | a2 | 0.000896 g | 0.007 |
| T-2 | a1 | 0.11264 g | a2 | 0.01536 g | 0.12 |
| T-3 | a1-2 | 0.11904 g | a2-2 | 0.00896 g | 0.070 |

[Preparation Example 1] Preparation of Solid Electrolyte Composition 180 zirconia beads having a diameter of 5 mm were put into a 45 mL zirconia container (manufactured by Fritsch Japan Co., Ltd.), the inorganic solid electrolyte shown in the following table, the binder (B)-containing solution prepared as described above, and heptane as a dispersion medium were put thereinto. Next, the container was set in a planetary ball mill P-7 (trade name, manufactured by Fritsch Japan Co., Ltd.) and the components were continuously mixed for 2 hours at room temperature and a rotation speed of 300 rpm. As a result, a solid electrolyte composition was prepared.

In a case where the solid electrolyte composition includes a conductive auxiliary agent, the above-described inorganic solid electrolyte, the binder (B)-containing solution prepared as described, the conductive auxiliary agent, and heptane as the dispersion medium were mixed with each other using the ball mill P-7 to prepare the solid electrolyte composition.

In a case where the solid electrolyte composition includes an active material, the active material was put thereinto, and the components were mixed at room temperature and a rotation speed of 150 rpm for 5 minutes. As a result, a solid electrolyte composition was prepared.

[Preparation Example 2] Preparation of Solid Electrolyte-Containing Sheet

Each of the solid electrolyte compositions prepared as described above was applied to a stainless steel (SUS) foil having a thickness of 20 μm as a current collector using a bar coater. The laminate was placed on a hot plate such that the SUS foil faced a lower surface, was heated at 80° C. for 1 hour to volatilize and remove the dispersion medium (even after the removal, a part of the dispersion medium remained as a residual solvent), and was pressurized under 300 MPa. As a result, a solid electrolyte-containing sheet was prepared.

[Test Example 1] Evaluation of Thickness Uniformity

Each of the solid electrolyte-containing sheets obtained in Preparation Example 2 was cut in a rectangular shape of 3 cm×5 cm. The cut sheet was partitioned at positions at respective distances of 0.5 cm, 1.5 cm, 2.5 cm, 3.5 cm, and 4.5 cm in order from an end in a major axis direction and was partitioned at positions at respective distances of 0.5 cm, 1.5 cm, and 2.5 cm in order from an end in a minor axis directions. The thickness of the sheet was measured at intersections between the respective partition points in the major axis direction and the minor axis direction. For the measurement, a constant pressured thickness measuring instrument (manufactured by OTEC Co., Ltd., PG-02J) was used. Among the obtained thickness values at the 15 points, a difference between a maximum value and a minimum value was obtained. The obtained value was evaluated based on the following evaluation standards to evaluate thickness uniformity.

<Evaluation Standards of Thickness Uniformity>

A: the difference between the maximum thickness and the minimum thickness was less than 5 μm B: the difference between the maximum thickness and the minimum thickness was 5 μm or more and less than 10 μm C: the difference between the maximum thickness and the minimum thickness was 10 μm or more and less than 15 μm D: the difference between the maximum thickness and the minimum thickness was 15 μm or more and less than 20 μm E: the difference between the maximum thickness and the minimum thickness was 20 μm or more and less than 25 μm F: the difference between the maximum thickness and the minimum thickness was 25 μm or more and less than 30 μm G: the difference between the maximum thickness and the minimum thickness was 30 μm or more The results are shown in the table below.

[Test Example 2] Ion Conductivity

Figure 2:
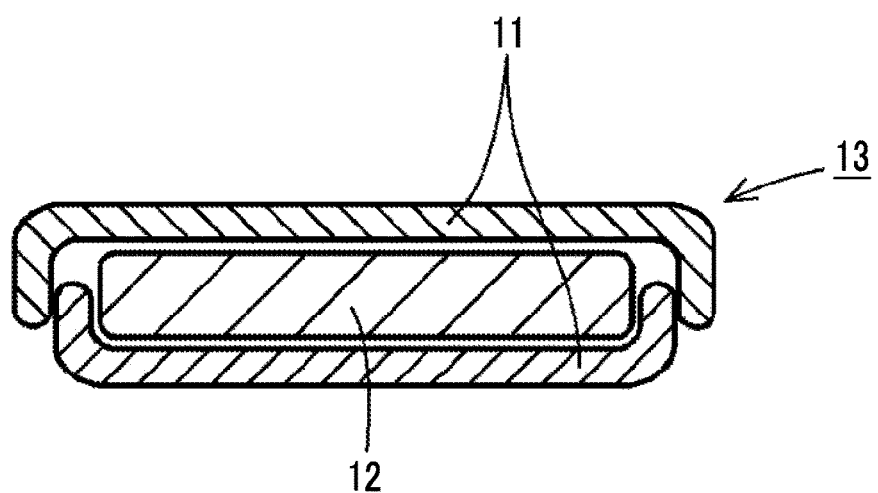
FIG. 2 is a vertical cross-sectional view schematically illustrating an all-solid state secondary battery (coin battery) prepared in Examples.

Each of the solid electrolyte-containing sheets obtained in Preparation Example 2 was cut into two sheets having a rectangular shape having a diameter of 14.5 mm. The solid electrolyte layers (in a case where the active material was included, the electrode layers) of the cut two sheets were bonded to each other to form a sheet for ion conductivity measurement, and the sheet for ion conductivity measurement was put into a 2032-type coin case 11 formed of stainless steel equipped with a spacer and a washer (not shown in FIG. 2). By swaging the 2032-type coin case 11, a test specimen for ion conductivity measurement having a configuration shown in FIG. 2 fastened with a force of 8 N was prepared.

Using the test specimen for ion conductivity measurement obtained as described above, the ion conductivity was measured. Specifically, the alternating current impedance was measured at a voltage magnitude of 5 mV in a frequency range of 1 MHz to 1 Hz using a 1255B frequency response analyzer (trade name, manufactured by SOLARTRON) in a constant-temperature tank at 30° C. As a result, the resistance of the bonded solid electrolyte-containing sheets (the sheet for ion conductivity measurement) in the thickness direction was obtained, and the ion conductivity was obtained by calculation from the following Expression (1). The obtained ion conductivity was evaluated based on the following evaluation standards.

Ion conductivity σ (mS/cm)=1000×Sample Thickness (cm)/(Resistance (Ω)×Sample Area (cm$^2$))  Expression (1)

In Expression (1), the sample thickness refers to the thickness of the solid electrolyte layer or the electrode layer.

<Ion Conductivity Evaluation Standards>

A: $0.60 \leq \sigma$
B: $0.50 \leq \sigma < 0.60$
C: $0.40 \leq \sigma < 0.50$
D: $0.30 \leq \sigma < 0.40$
E: $0.20 \leq \sigma < 0.30$
F: $\sigma < 0.20$ The results are shown in the table below.

The composition shown below in the table are the composition (by mass) of the solid electrolyte composition prepared in Preparation Example 1.

TABLE 2

| No. | Inorganic Solid Electrolyte Kind | Amount | Binder (B)-Containing Solution Kind | Amount | Dispersion Medium (C) Kind | Amount | Active Material (D) Kind | Amount | Conductive Auxiliary Agent (E) Kind | Amount | Sample Thickness (μm) | Thickness Uniformity Evaluation Result | Ion Conductivity Evaluation Result | Note |
|---|---|---|---|---|---|---|---|---|---|---|---|---|---|---|
| 11 | Li—P—S | 29 | S-1 | 7 | Heptane | 63 | — | 0 | — | 0 | 78 | B | A | Present Invention |
| 12 | Li—P—S | 29 | S-2 | 7 | Heptane | 63 | — | 0 | — | 0 | 81 | A | A | Present Invention |
| 13 | Li—P—S | 29 | S-3 | 7 | Heptane | 63 | — | 0 | — | 0 | 78 | A | A | Present Invention |
| 14 | Li—P—S | 29 | S-4 | 7 | Heptane | 63 | — | 0 | — | 0 | 83 | B | B | Present Invention |
| 15 | Li—P—S | 29 | S-5 | 7 | Heptane | 63 | — | 0 | — | 0 | 84 | B | A | Present Invention |
| 16 | Li—P—S | 29 | S-6 | 7 | Heptane | 63 | — | 0 | — | 0 | 81 | C | B | Present Invention |
| 17 | Li—P—S | 29 | S-7 | 7 | Heptane | 63 | — | 0 | — | 0 | 75 | B | B | Present Invention |
| 18 | Li—P—S | 29 | S-8 | 7 | Heptane | 63 | — | 0 | — | 0 | 85 | C | C | Present Invention |

TABLE 2-continued

| No. | Inorganic Solid Electrolyte Kind | Amount | Binder (B)-Containing Solution Kind | Amount | Dispersion Medium (C) Kind | Amount | Active Material (D) Kind | Amount | Conductive Auxiliary Agent (E) Kind | Amount | Sample Thickness (μm) | Thickness Uniformity Evaluation Result | Ion Conductivity Evaluation Result | Note |
|---|---|---|---|---|---|---|---|---|---|---|---|---|---|---|
| 19 | LLT | 29 | S-4 | 7 | Heptane | 63 | — | 0 | — | 0 | 89 | B | C | Present Invention |
| 20 | Li—P—S | 7 | S-1 | 5 | Heptane | 46 | NMC | 40 | AB | 3 | 71 | B | B | Present Invention |
| 21 | Li—P—S | 7 | S-2 | 5 | Heptane | 46 | NMC | 40 | VGCF | 3 | 87 | A | A | Present Invention |
| 22 | Li—P—S | 7 | S-3 | 5 | Heptane | 46 | NMC | 40 | AB | 3 | 77 | A | A | Present Invention |
| 23 | Li—P—S | 7 | S-4 | 5 | Heptane | 46 | NMC | 40 | AB | 3 | 85 | B | A | Present Invention |
| 24 | Li—P—S | 7 | S-5 | 5 | Heptane | 46 | NCA | 40 | — | 0 | 72 | A | C | Present Invention |
| 25 | Li—P—S | 7 | S-6 | 5 | Heptane | 46 | NCA | 40 | — | 0 | 85 | B | A | Present Invention |
| 26 | LLT | 7 | S-7 | 5 | Heptane | 46 | NMC | 40 | AB | 3 | 88 | B | C | Present Invention |
| 27 | LLT | 7 | S-8 | 5 | Heptane | 46 | NMC | 40 | AB | 3 | 81 | C | B | Present Invention |
| c11 | Li—P—S | 29 | T-1 | 7 | Heptane | 63 | — | 0 | — | 0 | 83 | E | E | Comparative Example |
| c12 | Li—P—S | 29 | T-2 | 7 | Heptane | 63 | — | 0 | — | 0 | 74 | E | G | Comparative Example |
| c13 | Li—P—S | 7 | T-1 | 5 | Heptane | 46 | NMC | 40 | AB | 3 | 73 | E | F | Comparative Example |
| c14 | Li—P—S | 7 | T-2 | 5 | Heptane | 46 | NMC | 40 | AB | 3 | 74 | E | F | Comparative Example |
| c15 | Li—P—S | 7 | T-3 | 7 | Heptane | 63 | — | 0 | — | 0 | 74 | E | F | Comparative Example |

"Amount": Part(s) by Mass

<Notes in Table>
(A): inorganic solid electrolyte
LLT: $Li_{0.33}La_{0.55}TiO_3$ (average particle size: 3.25 manufactured by Toshima Manufacturing Co., Ltd.)
Li—P—S: Li—P—S-based glass synthesized above
(D): active material
NMC: $LiNi_{1/3}Co_{1/3}Mn_{1/3}O_2$ (lithium nickel manganese cobalt oxide)
NCA: $LiNi_{0.85}Co_{0.10}Al_{0.05}O_2$ (lithium nickel cobalt aluminum oxide)
(E): conductive auxiliary agent
AB: acetylene black
VGCF: trade name, carbon fiber, manufactured by Showa Denko K.K.

As shown in Table 2, it was found that, in a case where the component composition of the binder (B) in the solid electrolyte composition did not satisfy the range of the present invention, a variation in thickness was large in a solid electrolyte-containing sheet formed using the composition. In addition, in the solid electrolyte-containing sheet, the ion conductivity was poor (No. c11 to c15).

Here, the binder T-3 containing solution was different from the range of the present invention in the ultracentrifugal separation condition of the binder B-1 mixed solution. The amount of the precipitate component after the ultracentrifugal separation of the binder B-1 mixed solution was visually the same as the amount of the precipitate component after the process of the binder mixed solution B-1 under the ultracentrifugal separation condition defined by the present invention, and the transparency of the supernatant component was also the same. However, the evaluation results were poor as shown in Table 2. That is, it was found that, in order to exhibit the effects of the present invention, it is important to classify the binder into two binders through the specific ultracentrifugal separation process defined by the present invention and to adjust the amounts of the respective binders at the specific ratio.

On the other hand, it was found that, in a case where the component composition of the binder (B) in the solid electrolyte composition satisfied the range of the present invention, a variation in thickness was small in a solid electrolyte-containing sheet formed using the composition, and the ion conductivity was also excellent (No. 11 to 27).

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: 2032-type coin case
12: electrode sheet for an all-solid state secondary battery
13: all-solid state secondary battery

What is claimed is:
1. A solid electrolyte composition comprising:
an inorganic solid electrolyte (A) having ion conductivity of a metal belonging to Group 1 or Group 2 in the periodic table;
a binder (B); and
a dispersion medium (C), wherein the binder (B) includes a first binder (B1) that precipitates by a centrifugal separation process and a second binder (B2) that does not precipitate by the centrifugal separation process, the centrifugal separation process being performed in the dispersion medium (C) at a temperature of 25° C. at a centrifugal force of 610000 G for 1 hour, and a content X of the first binder (B1) and a content Y of the second binder (B2) satisfy the following expression by mass, $$0.01 \leq Y/(X+Y) < 0.10.$$

2. The solid electrolyte composition according to claim 1, wherein the dispersion medium (C) is an organic solvent.

3. The solid electrolyte composition according to claim 1, wherein the first binder (B1) is a particulate binder.

4. The solid electrolyte composition according to claim 1, wherein a polymer forming the binder (B) includes a polymer that includes a component having a polyalkylene oxide chain.

5. The solid electrolyte composition according to claim 1, wherein a polymer forming the binder (B) includes a polymer that includes a component having a nitrile group.

6. The solid electrolyte composition according to claim 1, wherein the dispersion medium (C) includes a hydrocarbon solvent.

7. The solid electrolyte composition according to claim 1, further comprising an active material (D).

8. The solid electrolyte composition according to claim 1, further comprising a conductive auxiliary agent (E).

9. The solid electrolyte composition according to claim 1, wherein the inorganic solid electrolyte (A) is a sulfide-based inorganic solid electrolyte.

10. A solid electrolyte-containing sheet that is formed of the solid electrolyte composition according to claim 1.

11. A method of manufacturing a solid electrolyte-containing sheet comprising applying the solid electrolyte composition according to claim 1 to a substrate to form a coating film.

12. The method of manufacturing a solid electrolyte-containing sheet according to claim 11 further comprising drying the coating film.

13. A method of manufacturing an all-solid state secondary battery comprising:
applying the solid electrolyte composition according to claim 1 to a substrate to form a coating film; and
drying the coating film.

14. A solid electrolyte-containing sheet comprising:
an inorganic solid electrolyte (A) having ion conductivity of a metal belonging to Group 1 or Group 2 in the periodic table;
a binder (B); and
a solvent (C1),
wherein the binder (B) includes a first binder (B1) that precipitates by a centrifugal separation process and a second binder (B2) that does not precipitate by the centrifugal separation process, the centrifugal separation process being performed in the solvent (C1) at a temperature of 25° C. at a centrifugal force of 610000 G for 1 hour, and
a content X of the first binder (B1) and a content Y of the second binder (B2) satisfy the following expression by mass, $$0.01 \leq Y/(X+Y) < 0.10.$$

15. An electrode sheet for an all-solid state secondary battery comprising the solid electrolyte-containing sheet according to claim 14.

16. An all-solid state secondary battery comprising:
a positive electrode active material layer;
a negative electrode active material layer; and
a solid electrolyte layer that is interposed between the positive electrode active material layer and the negative electrode active material layer,
wherein at least one of the positive electrode active material layer, the negative electrode active material layer, or the solid electrolyte layer is the solid electrolyte-containing sheet according to claim 14.

* * * * *